United States Patent [19]
McKernan

[11] Patent Number: 5,901,664
[45] Date of Patent: May 11, 1999

[54] PORTABLE ANIMAL CARRIER

[76] Inventor: James M. McKernan, 1233 W. Sunnyside Ct., Visalia, Calif. 93277

[21] Appl. No.: 08/729,034

[22] Filed: Oct. 9, 1996

[51] Int. Cl.[6] .................................................... A01K 31/07
[52] U.S. Cl. ........................................... 119/453; 119/497
[58] Field of Search ..................... 119/496, 497, 119/453, 165, 168, 454, 498, 489; D30/109, 108; 190/20, 113, 119

[56] References Cited

U.S. PATENT DOCUMENTS

| | | | |
|---|---|---|---|
| 1,766,194 | 6/1930 | Schubart | 119/473 |
| 3,695,233 | 10/1972 | Kovarik | 119/496 |
| 3,834,352 | 9/1974 | Gervis | 119/453 |
| 3,941,092 | 3/1976 | Winters . | |
| 4,989,744 | 2/1991 | Tominaga . | |
| 5,005,234 | 4/1991 | Kelleher et al. | D30/109 |
| 5,307,758 | 5/1994 | Ho . | |
| 5,524,573 | 6/1996 | Hart | 119/489 |

FOREIGN PATENT DOCUMENTS

| | | | |
|---|---|---|---|
| 23312 | 10/1902 | United Kingdom | 190/119 |

*Primary Examiner*—Todd E. Manahan
*Assistant Examiner*—Eduardo C. Robert

[57] ABSTRACT

An improved portable animal carrier having a body (7) possessing a rigid, opaque wall structure. A pair of body end panels (10) extend upwards from the relative adjacent body side walls (11) forming a multi-purpose portion of the body (7). The panels (10) and the walls (11) are bonded to a base (9). A shaped, displaceble cover (8) overspread with a screen (14), possessing a plurality of apertures, attaches to the body (7) by a hinge (16), and on an opposing side, by latches (13). A handle (15) fastened to the cover horizontal center member (18) enhances portability.

1 Claim, 3 Drawing Sheets

PORTABLE ANIMAL CARRIER

BACKGROUND—FIELD OF THE INVENTION

This invention relates to portable animal carriers.

BACKGROUND—DESCRIPTION OF PRIOR ART

Raising pets and animals is becoming increasingly more popular. Easy to use, lightweight, and portable animal carriers are more in demand than ever. Many portable pet carriers have been designed to meet this demand. The most commonly known carriers feature an access door placed in the end of the carrier. Adequate for docile animals, however, not practical for animals of an excitable nature, i.e. cats, as the end door by its nature cannot be large enough to provide a sufficient entry space unless a much larger carrier is used, obviating the portability.

Therefore, the invention of a portable carrier with a proportionally greater entry door was the next obvious step. U.S. Pat. No. 3,941,092 to Winters (1976) discloses a portable apparatus for treating, bathing, rinsing, or fumigating household pets, or for transporting such pets, features a displaceable cover allowing greater access to the interior of the unit. However, the many orifices have closures which would restrict ventilation leaving only the large main opening at the end of the unit. This large opening, while providing a means for fresh air, also provides a large area where an animal, such as a cat, could reach out and claw the handler. If the animal's neck were placed in the jaws of the large opening allowing for the head to be outside of the box, there would be the danger of accidental trauma to all concerned.

U.S. Pat. No. 4,989,744 to Tominaga (1990) shows a portable container with a displaceable cover and body constructed of transparent or translucent plastics. Ventilation is also a concern as the primarily flat surface of the cover possesses the only means for that function. As such, the cover can easily be smothered, eliminating air to the interior of the container. The translucent or transparent construction also would increase the excitability of less docile animals.

U.S. Pat. No. 5,307,758 to Ho (1994) shows a portable pet house with increased ventilation area and a large area at the top of the house. Both are improvements on Winters and Tominaga. However Ho, requires the manipulation of four panels simultaniously which demands the handler to release the animal once inside the house hoping that the animal will not attempt escape. The handler is then required to use both hands to close the panels. In practical use this procedure is difficult at best. With the majority of cats, this is extremely troublesome and nerve-wracking to try to accomplish before the animal escapes. Injuries are likely to both animal and handler. A person of advanced age or medical problems would not be able to do this alone. All of this greatly impacts, negatively, its ease of use. Also, the most widely seen version of this patent comes in the form of cardboard which greatly decreases its durability.

OBJECTS AND ADVANTAGES

It is therefore an object of the present invention to provide a portable animal carrier which solves the problems discussed above. The advantages of the present invention are:

(a) to provide a portable animal carrier with a single hinged cover possessing a large surface area overspread with a sturdy and durable material having a plurality of holes. Combining superior ventilation with extreme ease of use;

(b) to provide a portable animal carrier body with end panels that extend upwards above adjacent side walls. These end panels will serve a dual purpose: while the cover is in the closed position the panels will protect the cover from being dislodged from an accidental blow by extending to a point parallel, in all applicable directions, to the dimensions of the cover end panels. Thus the cover 'nests' within the body end panels, resting upon the body side walls. Also the body end panels greatly decrease the area through which a motivated animal can escape while loading and closing the carrier providing a large increase in safety for the animal handler;

(c) to provide a portable animal carrier that, by design, can be used to transport animals of a hostile nature, while giving the animal's handlers greater security than prior art;

(d) to provide a portable animal's carrier that eliminates the risk of injury, by claw or tooth, to those near the carrier when it is in use, by doing away with orifices large enough to get a paw, paw/arm combination, or a head through;

(e) to provide a portable animal carrier utilizing opaque materials;

(f) to provide a portable animal carrier that, when made in a sufficient size for use with small or medium proportioned animals, can be used to transport animals, of this size, on board airliners. Specifically as under-seat or carry-on luggage while maintaining a rigid construction;

(g) to provide a portable animal carrier constructed with, and using a variety of durable, long lasting materials.

DRAWING FIGURES

FIG. 1 a perspective view, showing the carrier in accordance with the present invention, with the cover closed, hinge side exposed.

FIG. 2 a perspective view similiar to FIG. 1, but with the cover in the open position.

Reference Numerals In Drawings

| | | | |
|---|---|---|---|
| 7 | body | 8 | cover |
| 9 | base | 10 | body end panel |
| 11 | body side wall | 12 | cover end panel |
| 13 | latch | 14 | screen |
| 15 | handle | 16 | hinge |
| 17 | cover horizontal side member | | |
| 18 | cover horizontal center member | | |
| 19 | latch mating piece | | |

SUMMARY

The essence of this invention is to provide a safer, easier to use portable animal carrier.

Figure 1:
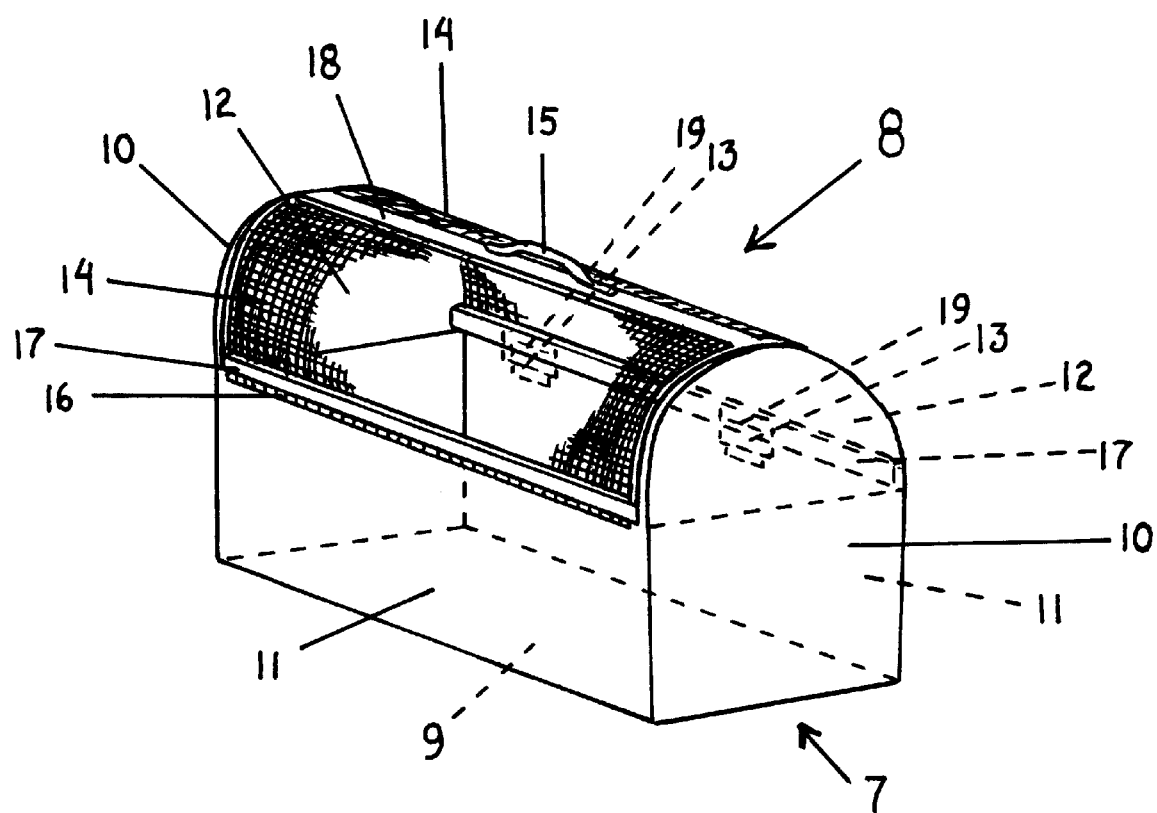
Figure 2:
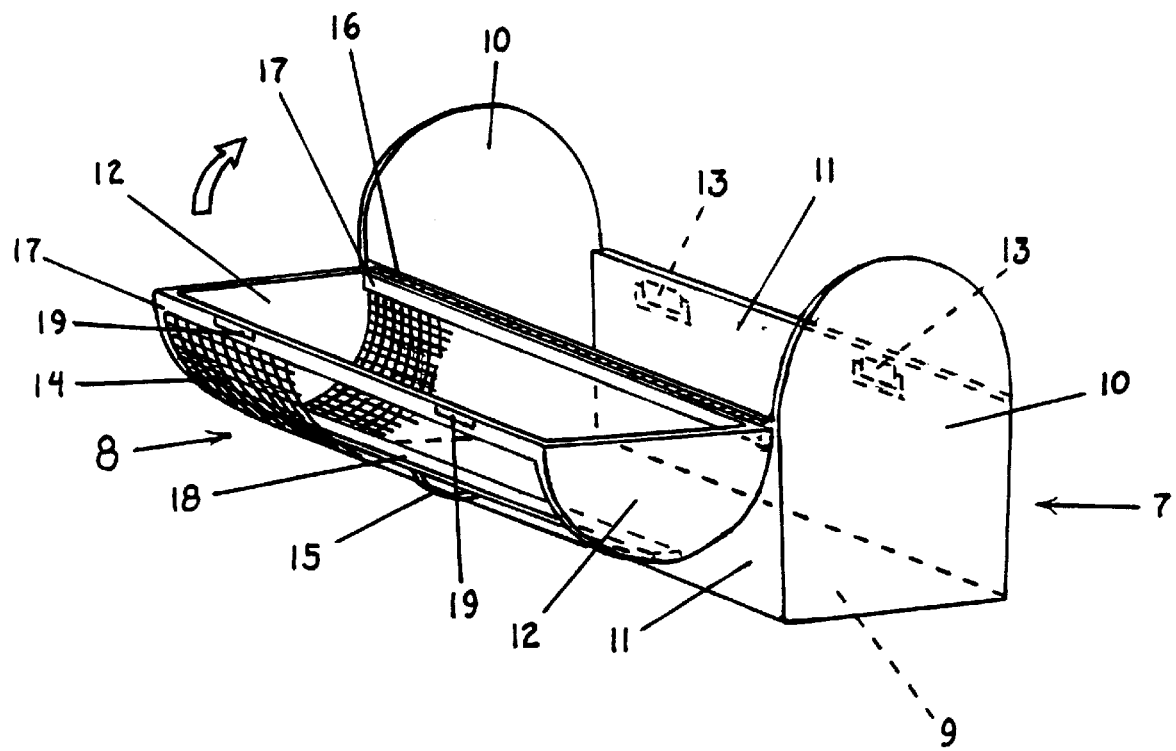
Figure 3:
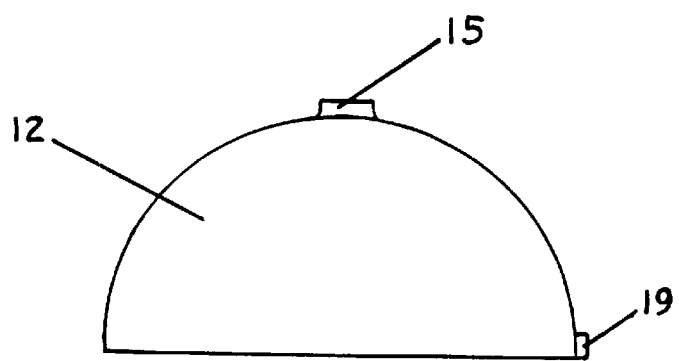
FIG. 3 shows the cover when viewed at an end panel.

Description—FIGS. 1 to 3

Refering to the drawings, FIG. 1 shows a perspective view of the preferred embodiment of the carrier. The carrier is comprised of two primary parts: a single cover 8 that provides unlimited access to the body 7 which accommodates the animal to be transported.

The body 7, preferably made using opaque plastic materials, has a rigid peripheral wall structure. The body 7 is comprised of a pair of body end panels 10, a pair of body side walls 11, and a base 9. Each of the panels 10 extend upwards above the adjacent walls 11 to such a point as to allow the cover 8 to nest within the panels 10 while the cover 8 is in the closed position (FIG. 1). The upper portion of the panels 10 conform in shape to the cover 8 when viewed with the cover 8 in the closed position (FIG. 1).

The cover 8 takes the shape of a hollow cylinder halved down its' center, longitudinal axis, as seen in FIG. 3.

The cover 8 consists primarily of a pair of cover end panels 12, a pair of cover horizontal side members 17, and a cover horizontal center member 18. Preferably made in a single unit using opaque plastic materials. The cover 8 is overspread completely with a screen 14 preferably made of a durable, semi-rigid material consisting of a plurality of openings. The cover 8 also has a handle 15 attached at a central position on the exterior of member 18.

The cover 8 is adapted to move between a closed position (FIG. 1) and an open position, as seen in FIG. 2, by a hinge 16 permanently attached to one of the cover members 17 and a corresponding body wall 11.

The cover 8, while in the closed position (FIG. 1), can be temporarily completely attached to the body 7 by latches 13 afixed to the upper most exterior portion, at a predetermined position, of the remaining body wall 11, not previously engaged to the hinge 16. The latches 13 mate with corresponding latch mating pieces 19 affixed to the exterior portion of the member 17 not previously engaged with hinge 16 at a predetermined position that matches the latch 13 already in place on wall 11.

Operation—FIGS. 1 to 3

The manner of using the portable animal carrier, of this invention, to transport animals is a very simple proceedure.

Assuming the size of the animal desired to be transported does not exceed the size of the carrier at hand, we proceed.

For use, the latches 13 are unfastened from their corresponding latch mating pieces 19. The cover 8 is then moved upwards and out by grasping the handle 15 and lifting away from the latches 13, pivoting on the hinge 16.

Placing the animal in the body 7, the handler immediately benefits from the body end panels 10. Who, by their shape, act to minimize the area in which the animal can move to force an escape. While holding on to the neck of the animal using one hand, the handler rotates the cover 8 back down towards the latches 13 using the opposite hand. Once again the handler immediately benefits, as the area available for escape is reduced quickly at a rate commensurate with the rate of closure, due to the shape of the cover 8 and the existance of the end panels 12 and 10.

In practical trials using cats, whose nature compels it to resist confinement, it was observed that they moved consistantly in a program towards escape. Four directions were observed: 1) forward, which was blocked by a panel 10, 2), backwards, again blocked by a panel 10, 3) upwards, again blocked, this time by the downward moving cover 8, 4) Lastly and far to late to be effective sideways.

Once inside the body 7 and the cover 8 is securely attached to the body 7 by the fastening of the latches 13 to their corresponding mating pieces 19, the cat was able to curl up on the base 9 of the body 7. In this position the cat was afforded a sense of security provided by the walls 11 and the panels 10 as they are of an opaque material. Conversely, panels 10 provide protection to the cover 8 in case of an accidental blow to the carrier, in which case, if the carrier were to lack panels 10 a dislodgement of the cover 8 may result.

Airline use is simply accomplished by either checking the carrier, of this invention, in as luggage bound for the cargo hold or, more importantly and as a result of this design, by using it as a piece of carry-on luggage. By simply placing the carrier on its' horizontal side, a unit sized for holding one or even two cats or a small dog will easily fit under the majority of airline seats. The screen 14 can easily accept several water feeders already on the market by placing the feeder inside the cover 8 and attaching it to the screen 14 allowing the animal water for a long trip.

Figure 4:
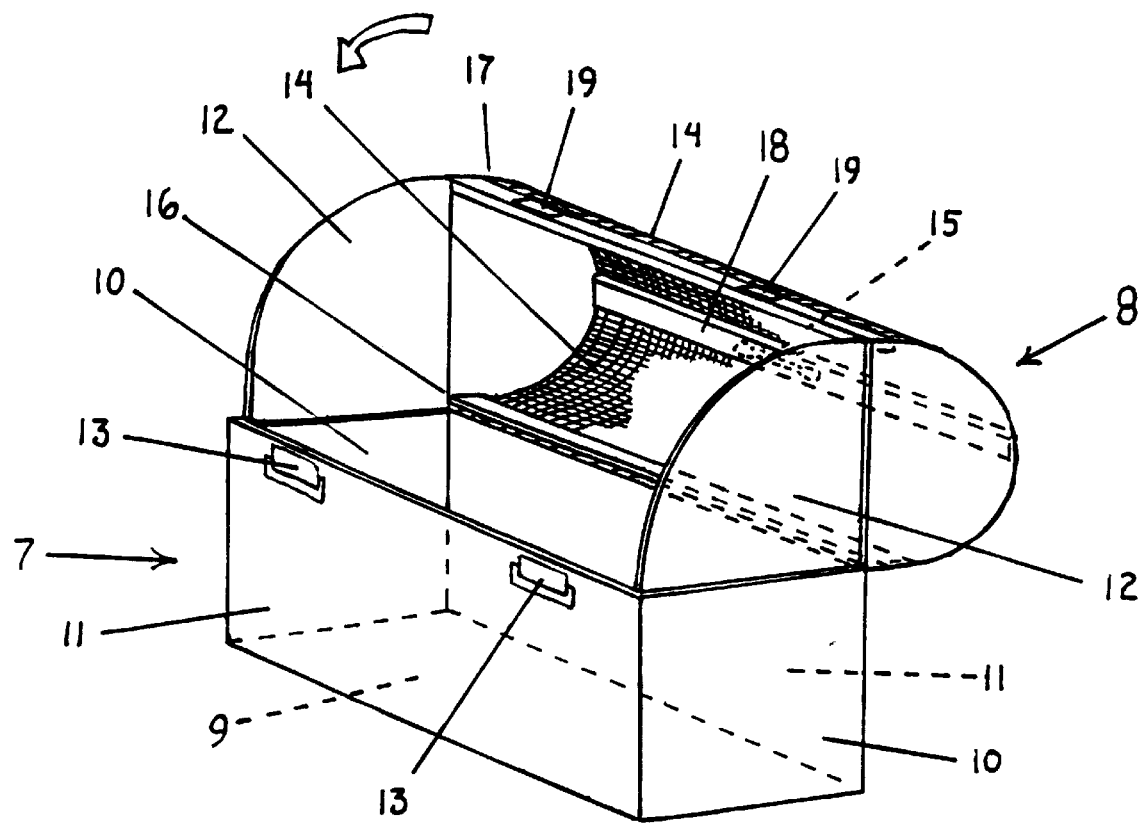
FIG. 4 shows a perspective view of a possible embodiment in the open position, with cover end panels possessing portions that extend into the body as and when the cover is closed.

Description—FIG. 4

FIG. 4 shows a perspective view of a possible embodiment of the invention previously detailed. Shown in the open position FIG. 4 illustrates a change in the shape of the cover end panels 12. Showing panels 12 possessing portions that extend below into the body 7 when the cover 8 is in the closed position. The cover 8 assumes a shape similiar to the retractable spouts found on cardboard food and powdered soap containers (as illustrated in FIG. 4).

This version eliminates the need for the body end panels 10 to extend above the relative height of the body side walls 11. Both pairs would be of the same relative predetermined height.

Operation—FIG. 4

FIG. 4 illustrates the only difference between this embodiment and the other possible embodiments discussed. See FIGS. 1, 2, 3, 5.

This possible embodiment operates in the same manner as the other possible embodiments (FIGS. 1, 2, 3, 5).

Figure 5:
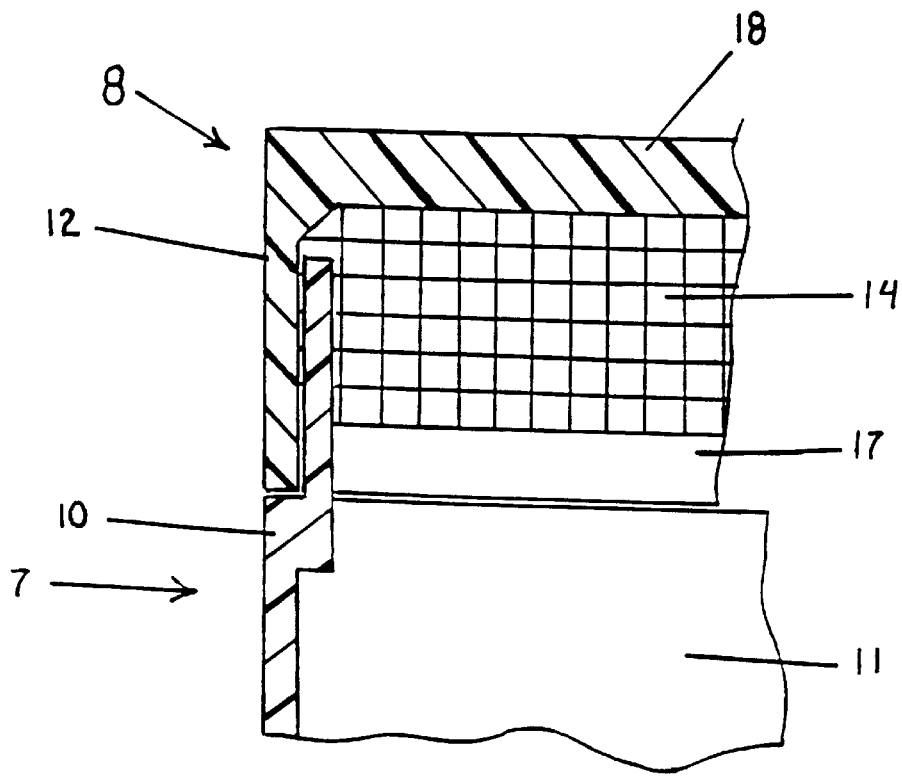
FIG. 5 shows a partial cut-away, side view of a possible embodiment with a body end panel inboard of the cover end panel, while in the closed position.

Description—FIG. 5

FIG. 5 shows a partial sectional view illustrating a change in the position of the upper portions of the body end panels 10 in relation to the cover end panels 12. In this view the upper portion of the panels 10 are formed to reside inboard of panels 12 while the cover 8 is in the closed position. The cover 8 would be slightly lengthened in order to fit on the outside of the end panels 10 instead of inside. Thus the cover 8 appears flush to the body 7 when in the closed position. Only upon close inspection will the panels 10 be noticed.

This view, (FIG. 5), illustrates the only difference between this embodiment and the preferred embodiment (FIGS. 1, 2). The cover would retain the shape outlined in the descriptions relating to FIGS. 1, 2, and 3.

Operation—FIG. 5

The possible embodiment shown in FIG. 5 operates in the same manner as the preferred embodiment outlined in the text referring to FIGS. 1 and 2.

Summary, Ramifications, and Scope

Thus the reader will see that the portable animal carrier of this invention provides increased ease of use through the operation of a single cover. Increased safety for both the handler and the animal to be transported by providing safeguards for their protection. Furthermore, the design of this invention has the additional advantage in that:

it provides a carrier for airline use with a rigid, top-loading design;

it permits the loading of hostile animals with greater ease of use than prior art.

While my above description contains many specificities, these should not be construed as limitations on the scope of the invention, but as examples of a preferred embodiment and variations of the preferred embodiment. Many other variables are possible, for example: the body and cover portions may be made from transparent or translucent plastics.

Variations in the formulation and color of plastics used are unlimited. The type of material it is made out of and the manufacturing processes used may be as varied as can be imagined. Shaped wooden parts or aluminum, for an example, may be employed. The carrier may be made to assume different shapes such as triangular, square, etc. . . . The hardware used may take on a wide variety of types, styles, and composition. Cold hot dipped galvanized steel, chromed steel, brass, etc. . . . The screen material can also be made of a wide array of materials and styles while retaining integrity of design. The hinge(s) and latches are not limited in style, type, or size. One large hinge or several smaller ones or a combination may be used. The same holds true for the latches employed. Even the actual size of the carrier can vary as well, from very small to quite large.

Accordingly the scope of the invention should be determined not by the embodiments illustrated, but by the appended claim and their legal equivalents.

I claim:

1. A portable animal transport carrier comprising:

a body portion having a rectangular base, a pair of solid body end panels extending upwardly from opposite ends of said base, and a pair of solid body side panels extending from opposite sides of said base, each side panel being connected to said end panels so as to form a box-like enclosure having an open top, said body portion further having an extension panel extending upwardly from each end panel;

a rectangular cover portion having a pair of opposed solid upright cover end panels, each cover end panel having a bottom and a top, a pair of horizontally opposed side members extending between the bottoms of said cover end panels and a horizontal center member extending between the tops of said cover end panels, said cover portion further have a rectangular screen-like material having two long sides and two short sides, overlying said pair of horizontal side members and said horizontal center member with each long side thereof attached to a respective horizontal side member and each short side making continuous contact with a respective cover end panel of said cover portion, and a handle disposed on said horizontal center member;

hinge means for attaching one of said horizontal side members of said cover portion to one of said body side panels, such that said cover portion is pivotable between a closed position wherein said cover portion is nested between said upwardly extending extension panels of said body portion providing protection for said cover portion from accidental dislodgment, and an open position wherein said cover end panels of said cover portion and said upwardly extending extension panels of said body portion serve to restrict the amount of available area through which an animal might attempt forced egress, while simultaneously allowing total access to the interior of said body portion; and a latch means opposite said hinge means for securing said cover in the closed position.

* * * * *